United States Patent [19]
Beker et al.

[11] 4,387,371
[45] Jun. 7, 1983

[54] DATA TRANSMISSION SYSTEMS

[75] Inventors: Henry J. Beker, Salisbury; John M. K. Friend, Hythe, both of England

[73] Assignee: Racal-Comsec Limited, Bracknell, England

[21] Appl. No.: 189,145

[22] Filed: Sep. 22, 1980

[30] Foreign Application Priority Data

Sep. 28, 1979 [GB] United Kingdom ................. 7933706

[51] Int. Cl.$^3$ .............................................. H04Q 5/00
[52] U.S. Cl. ................................ 340/825.52; 375/119
[58] Field of Search ...................... 340/825.52, 855.53; 455/38; 370/92; 375/110, 119

[56] References Cited

U.S. PATENT DOCUMENTS

| | | | |
|---|---|---|---|
| 3,694,757 | 9/1972 | Hanna | 370/92 |
| 4,064,488 | 12/1977 | Chapman | 340/825.53 |
| 4,091,361 | 5/1978 | Eichelberger | 340/825.52 |
| 4,156,866 | 5/1979 | Miller | 340/825.52 |
| 4,200,862 | 4/1980 | Campbell | 340/825.52 |

Primary Examiner—Harold I. Pitts
Attorney, Agent, or Firm—Leydig, Voit, Osann, Mayer & Holt, Ltd.

[57] ABSTRACT

A data transmission system comprises a transmitter transmitting data messages to n receivers by means of a link. Each message is preceded by a preamble. Each preamble is such that it can either be recognized only by one of the receivers (to whom, alone, the message is directed) or it can be recognized by all receivers when the message is intended for all of them. Each preamble is recognized if at least x of its y bits are recognized. At each receiver, the received preamble is sampled at a multiple of the bit rate and the respective pulse trains produced by the same-numbered samples in each bit period are individually compared with the two predetermined preambles to be recognized by that receiver. The identities of the pulse trains which match either of the predetermined preambles are recorded and the clock in the receiver is then phase-shifted so as to center its bit periods with the sampling pulses producing that one of the matching pulse trains whose sampling pulses are time-positioned midway of the sampling pulses producing all the matching pulse trains. The sampling rate is then reduced to bit rate, and the receiver is thus synchronized with the bit rate of the incoming message.

14 Claims, 5 Drawing Figures

DATA TRANSMISSION SYSTEMS

BACKGROUND OF THE INVENTION

The invention relates to data transmission systems.

BRIEF SUMMARY OF THE INVENTION

According to the invention, there is provided a data transmission system for transmitting data messages from a data transmitter to a specific one of a plurality of receivers to which the transmitter is connected by a transmission link, comprising preamble generating means in the transmitter for immediately preceding each data message with a predetermined preamble which is intended to be recognisable by one of the receivers to which the message is directed, but not by others of the receivers to which the message is not directed, recognition means in each of the receivers for testing for recognition each preamble received via the transmission link, and synchronisation means in each receiver which is responsive to each recognised preamble for synchronising that receiver with the data message immediately following the preamble.

According to the invention, there is also provided a data transmission system, comprising a data transmitter connected by a transmission link to a plurality of data receivers for sending data messages to any specific one of the receivers, preamble generating means at the transmitter for preceding each data message with a selected one of a plurality of different predetermined preambles and for transmitting the selected preamble to all the receivers immediately before the data message, one of the preambles being recognisable by all the receivers and each of the remaining preambles being recognisable only by a specific one of the receivers, and recognition means in each receiver for recognising either the said one preamble or the respective one of the remaining preambles and, in response to such recognition, for receiving the immediately following data message.

According to the invention, there is further provided a data transmission system, comprising a data transmitter connected to a data receiver by a data transmission link, means in the transmitter for transmitting to the receiver a predetermined waveform having a predetermined frequency, means in the receiver and operative at a predetermined multiple of a reference frequency which is equal to the predetermined frequency but not necessarily in phase therewith to produce successive amplitude samples of each cycle of the predetermined waveform, means responsive to the samples to produce a plurality of pulse trains the first of which comprises pulses respectively dependent on the first amplitude sample in each period of the predetermined waveform, the second of which comprises pulses respectively dependent on the second amplitude sample of each cycle of the predetermined waveforms, and so on for the remaining pulse trains, means operative to compare each pulse train with a waveform corresponding to the predetermined waveform to determine which of the pulse trains have waveforms corresponding with the predetermined waveform and which do not, means operative in response to the pulse trains detected as having waveforms agreeing with the predetermined waveform to assess the serial position within a period of the reference frequency of the samples producing those pulse trains to identify the central one of those serial positions, and phase-shift means operative to phase-shift the reference frequency of the receiver to bring it onto phase with the central one of those serial positions, whereby to synchronise the reference frequency of the receiver with the predetermined frequency.

DESCRIPTION OF THE DRAWINGS

Data transmission systems embodying the invention will now be described, by way of example only, with reference to the accompanying diagrammatic drawings in which.

DESCRIPTION OF PREFERRED EMBODIMENTS

Figure 1:
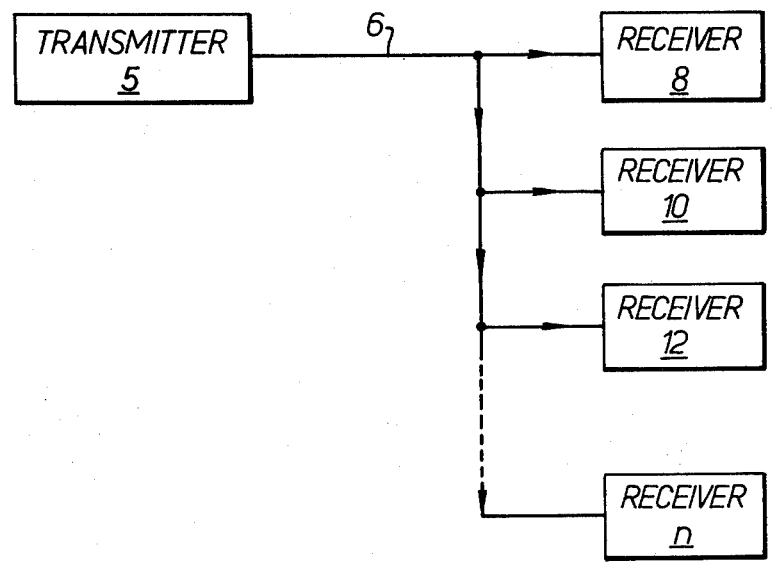
FIG. 1 is a block diagram of one of the systems.

As shown in FIG. 1, the system comprises a data transmitter 5 from which the data originates and which is connected by a suitable data transmission link 6 to data receivers 8, 10, 12 . . . n.

The system is arranged to transmit data in a manner which enables the data to be addressed either to any specific one of the receivers (so as to be recognised and received by that receiver but not by the other receivers) or to all the receivers (this is termed the "broadcast" mode).

Figure 2:
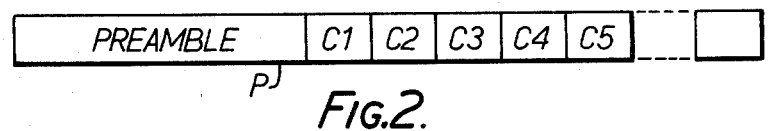
FIG. 2 is a diagram showing the form in which data characters are transmitted in the system of FIG. 1.

FIG. 2 shows diagrammatically the manner in which data is transmitted.

As shown, the data is transmitted in the form of characters C1, C2, C3 . . . each of which contains the same predetermined number of, in this example, binary digits. Each message (that is, a number of successive characters) is preceded by a preamble P. The preamble is also made up of a predetermined number of bits.

In a manner to be described, the system is arranged so that each receiver is able to use the preamble for three functions:

(a) for character framing, that is, to recognise that a data message is about to begin and begins immediately after the end of the preamble;

(b) as an address, that is, to determine whether or not the data message which is about to begin is intended for that receiver specifically or whether it is a message being transmitted in the broadcast mode;

(c) for bit synchronisation, that is, to enable the receiver to synchronise itself with the bits of the data message.

The end of the message is signified by a postamble which will not be discussed further.

In order to achieve the second of the three functions, that is, the addressing function, the system is arranged to be able to produce (n+1) different preambles. Of these, each of n of them is recognised by a respective one of the receivers as indicating that the message following is intended for that receiver alone, while the (n+1)th preamble is recognised by all the receivers as indicating that the message following is transmitted in the broadcast mode and is therefore to be received by all the receivers. Therefore, each message transmitted by the transmitter 5 is preceded by the appropriate one of the preambles in order to achieve the addressing function and each receiver must be capable of recognising two preambles.

Each preamble contains y bits. In a manner to be explained in more detail the system is arranged so that each receiver can recognise either of its two preambles provided that it is able to recognise at least x bits of the preamble, where x is less than y. Therefore, up to (y-x) errors can be incurred in a preamble and the receiver or receivers for which it is intended will still recognise it. Each receiver holds in store the two preambles which it is to be capable of recognising. Each receiver inspects each incoming bit and makes two comparisons: each is a comparison between, on the one hand, a block of data comprising that bit and the previous (y-1) bits and, on the other hand, the y bits of a respective one of the two predetermined preambles which it is storing. If at least x bits of the two blocks compared in either of the two comparisons agree, then the receiver recognises the preamble and accepts the next bit as the first bit of the first character of a message intended for that receiver.

x is chosen so that the probability of accepting the preamble (assuming that it is sent) is high (e.g. 0.95) in relation to the mean error rate expected for the transmission link, and so that the probability of the receiver accepting a preamble when in fact no preamble was sent, and there is just noise on the line, is very low (typically $10^{-8}$). x must not be so high in relation to the expected error rate for the transmission link that transmission errors are likely to cause the receiver to fail to recognise a preamble as one of its stored preambles. In addition, each preamble needs to be designed so that the receiver has a low probability of recognising a correctly transmitted and received preamble until it has compared all y bits of that preamble with the stored bits of its two specific preambles (and found that at least x bits of the received preamble agree with x bits of one of its two stored preambles). If the preambles were designed such that a receiver could (assuming no transmission errors) recognise a preamble as being one of its stored preambles before all the y bits of the incoming preamble had been received, then it would incorrectly assume that the (x+1)th bit of the received preamble was the first bit of the first character of the message.

Preferably, the system uses preambles which each have a two-valued autocorrelation function.

In order to ensure that there is a very small probability of a receiver incorrectly recognising the preamble of a message intended for one of the other receivers, the (n+1) preambles are designed such that every pair of them have a large difference, that is, have a large Hamming distance between them. Advantageously, they are designed such that the Hamming distance between every pair of them is greater than 2(y-x).

In a manner to be more specifically described, this may be achieved by producing the preambles from two basic bit sequences, I and II, where $I = a_1, a_2, a_3, \ldots a_y$; and $II = b_1, b_2, b_3, \ldots b_y$.

Then, in order to produce the first of the (n+1) preambles, I and II are added together to produce a first preamble, $P_1$, where $P_1 = (a_1+b_1), (a_2+b_2), (a_3+b_3), \ldots (a_y+b_y)$.

The second preamble, $P_2$, is produced by phase-shifting one of the basic bit sequences I and II by one bit and then adding it to the other basic bit sequence, so as to produce $P_2 = (a_1+b_2), (a_2+b_3), (a_3+b_4) \ldots (a_y+b_1)$.

This process is repeated so as to produce further preambles, e.g. $P_3$ and $P_4$:

$P_3 = (a_1+b_3), (a_2+b_4), (a_3+b_5) \ldots (a_y+b_2)$;

$P_4 = (a_1+b_4), (a_2+b_5), (a_3+b_6) \ldots (a_y+b_3)$.

This process is repeated to produce the requisite number of preambles (assuming that (n+1) is less than y).

Figure 3:
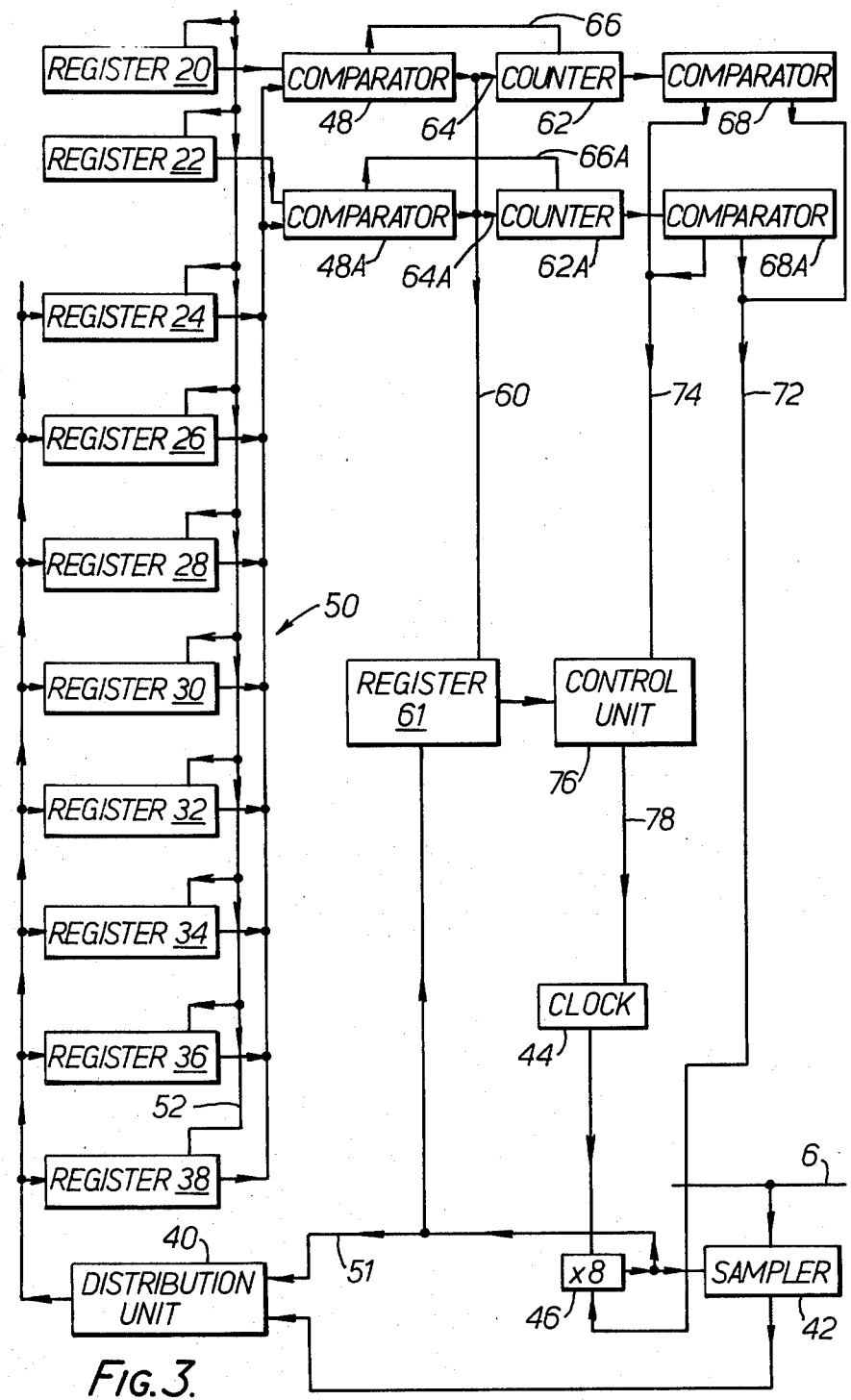
FIG. 3 is a more detailed block diagram of one of the receivers in the system.

The method by which each receiver is brought into bit-synchronisation with a message addressed to it will now be described with reference to FIG. 3 showing one of the receivers in block diagram form.

As shown, the receiver comprises two registers 20 and 22 which respectively store the two preambles (referred to below as $P_a$ and $P_b$) to be recognised by that receiver. In addition, the receiver includes eight further registers 24 to 38 each having a capacity of y bits.

The registers 24 to 38 are connected to receive samples of the incoming data in a manner to be explained, this incoming data being distributed to the eight registers by a distribution unit 40. The data samples are produced by sampling gate 42 connected to the transmission link 6. The sampling gate 42 is controlled by clock signals produced by the receiver's clock pulse source 44 which are fed to the sampling gate 42 via a multiplier 46 having (in this example) a multiplication factor of 8.

The bits in each of the registers 24 to 38 can be compared, bit by bit, with the bits in each of the registers 20 and 22 by means of respective comparators 48 and 48A. The bits are fed from each of the registers 24 to 38 to the comparators 48 and 48A by means of a data channel 50.

Figure 4:
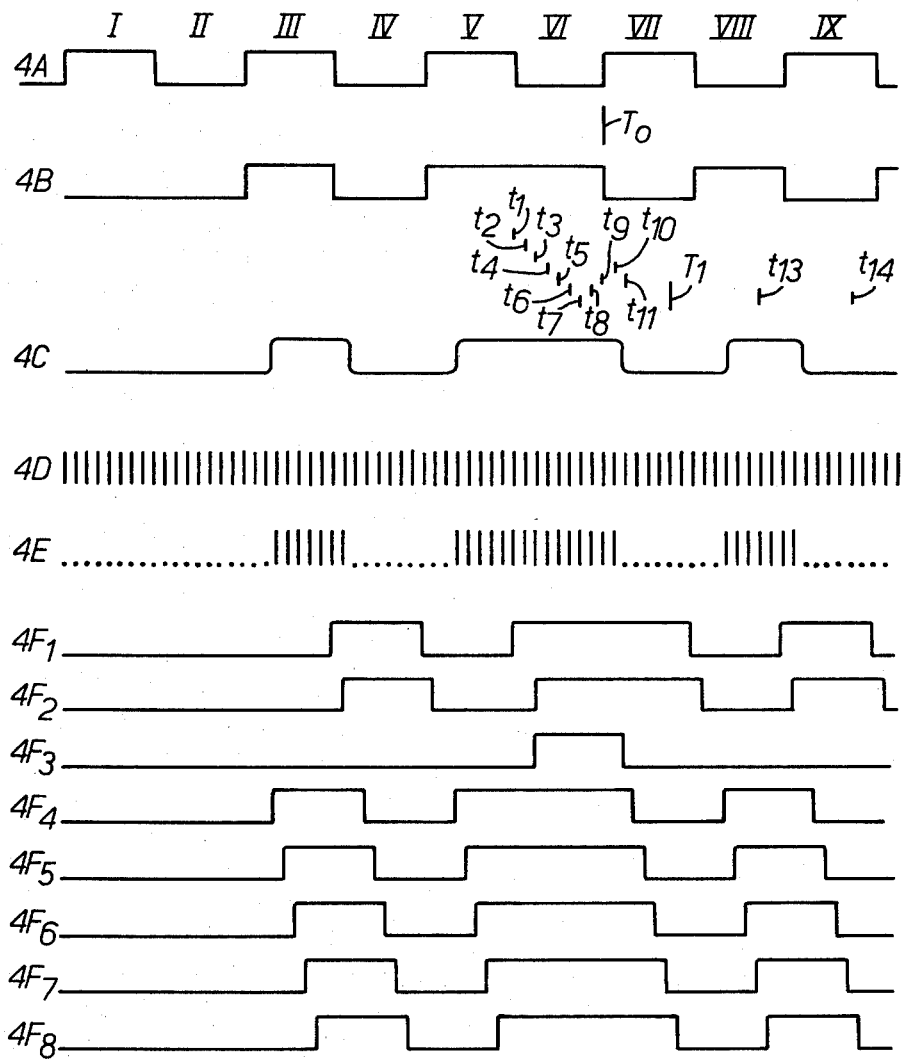
FIG. 4 shows waveforms occurring in the system.

The operation of the receiver as so far described will now be explained with reference to FIG. 4.

FIG. 4A shows nine clock periods numbered I to IX of the receiver clock 44.

It will be assumed that the transmitter is transmitting on the link 6 the preamble of a message intended for the particular receiver under consideration. The waveform of the preamble as received by the receiver is shown in bit periods I to VI of FIG. 4C (the data message starts at time $T_o$). It will also be assumed that the preamble is being received without error. However, as is shown by a comparison of waveform 4C with waveform 4A, the preamble is not being received in bit-synchronisation with the receiver clock. Furthermore, it has been distorted by transmission, from a pure rectangular waveform. Waveform 4B shows the waveform which the preamble would have if it were being received in bit-synchronisation with the receiver clock and with no distortion. Waveform 4B therefore represents the waveform produced if the preamble $P_a$ stored in register 20 were to be read out in bit-synchronisation with the receiver clock 44. In this example, the preamble consists of six bits 0 0 1 0 1 1 (in FIG. 4, a high level represents a "1", a low level represents a "0").

Before the receiver can begin to receive the data message, its clock pulse waveform must be bit-synchronised with the message—so that the receiver can correctly sample the first bit of the message at its mid point ($T_1$).

In order to carry out this synchronising process, the sampling gate 42 (FIG. 3) is operated at a multiple of the clock frequency—because the clock signals from the clock 44 are fed to the sampling gate 42 via the multiplier 46 which, in this example, has a multiplication of 8. The sampling instants are therefore as shown in waveform 4D. Waveform 4E shows the samples taken of waveform 4C at the sampling instants of waveform 4D. A dot signifies a "0", a vertical line signifies a "1".

The data samples taken by the sampling gate 42 are directed into the eight registers 24 to 38 in sequence by the distributing unit 40. This is controlled, via line 51, in synchronism with the sampling pulses produced by the multiplier 46 so that the data samples taken at the first sampling instant in each cycle of the clock waveform are all fed into register 24, the data samples taken at each second sampling instant are fed into register 26, and so on for the remaining data samples, so that the data samples taken at each eighth sampling instant are fed into register 38. Each register 24 to 38 can hold six bits.

After each data sample has been fed into its appropriate register 24 to 38, the contents of that register are rapidly fed out onto the channel 50 by means of timing signals occurring on a line 52 at a multiple of the sampling rate. Synchronously with this, the bits of the stored preambles $P_a$ and $P_b$ are fed out of the registers 20 and 22. Therefore, each comparator 48, 48A makes a bit by bit comparison of the y bits (where y=6 in the present example) of the corresponding one of the stored preambles $P_a$ and $P_b$ with the y data samples from the particular one of the registers 24 to 38 being interrogated. Thus, more specifically, during each bit period of the receiver clock, the comparator 48 carries out eight comparisons in sequence: first, it compares the value of the data sample taken at the first sampling instant of that bit period, together with the values of the data samples taken at the first sampling instants during the previous (y−1) or five (in this example) bit periods, with the six bits of the stored preamble $P_a$ in register 20; secondly, it compares the value of the data sample taken at the second sampling instant in that bit period, together with the values of the data samples taken at the second sampling instants in the previous five bit periods, with the preamble $P_a$ stored in register 20; and so on for the remaining six sampling instants of that bit period. Comparator 48A carries out eight similar comparisons at the same time, but of course these are made with the preamble $P_b$ stored in register 22.

Waveform 4F₁ shows how the data samples stored in register 24 (the data samples taken during the first sampling instants) can be represented, while waveforms 4F₂ to 4F₈ show how the data samples in registers 26 to 38, respectively, can be represented. In effect, therefore, comparator 48 makes a bit by bit comparison of each of the waveforms 4F₁ to 4F₈ in turn with the waveform 4B (in waveforms 4F₁ to 4F₈, the sample pulses stored in the registers 24 to 38 are each shown stretched out to the length of a bit period to enable the waveforms to be more easily compared with the waveform 4B). Comparator 48A operates in similar fashion but of course it compares each of the waveforms 4F₁ to 4F₈ in turn with the waveform (not shown) of the preamble assumed to be stored in register 22.

Each comparator is arranged to produce a "1" when it makes a successful comparison, that is, when it determines that at least x bits of the two waveforms being compared agree (where x is as discussed above). If the comparison is unsuccessful (less than x bits agree), the comparator produces a "0" output. When the comparator 48 makes the first successful comparison after an unsuccessful comparison it energizes a line 60 which causes the identity of the particular one of the registers 24 to 38 producing the successful comparison to be stored in a memory 61. In other words, memory 61 identifies which of the eight sampling instants in a bit period produced this first successful comparison.

As shown in FIG. 3, each "1" output of comparator 48 is fed to a counter 62 on a line 64 and increments the count of the counter 62 by 1. When the comparator 48 produces a "0" output this is fed to the RESET input of the counter 62 by means of a line 66 and resets the counter to zero. Each "0" output from comparator 48 also causes the immediately previous count in the counter 62 to be fed into a further comparator 68 where the value of the count is compared with a threshold number which is less than the number of data samples being taken during each bit period of the receiver. Therefore, in the example being considered, this threshold number is less than eight and may be, say, six. In response to each unsuccessful comparison by the comparator 48, the comparator 68 therefore determines how many successful comparisons occurred immediately preceding the unsuccessful comparison. If comparator 68 determines that the number of successful comparisons recorded by the counter 62 is less than the threshold number (6 in this example), the process repeats and the counter starts again to count the successful comparisons as they occur. However, if the comparator 68 determines that the number of successful comparisons recorded by the counter 62 at that time is more than the threshold number, it switches off the multiplier 46 by means of a line 72 so that the sampling gate 42 now samples at the receiver clock pulse rate. At the same time, it feeds the count value representing the number of successful comparisons into a control unit 76 by means of a line 74.

Control unit 76 receives from memory 61 the identity of the sampling instant which produced the first of the successful comparisons and it can therefore determine the time instant which is midway between the sampling instants corresponding to the first and last successful comparisons recorded by the counter 62. By means of a line 78, the control unit 76 rephases the clock 44 so that the first data sample taken by the sampling gate 42 at the lower sampling rate (that is, at the clock pulse rate) occurs at the next following time instant corresponding to this midway time instant (that is, in the next bit period).

This process bit-synchronises the receiver clock pulse waveform with the incoming data as will be described in more detail now with reference to FIG. 4.

On the assumption that the value of x and the form of the preamble $P_a$ of waveform 4B are both such that it is not possible for comparator 48 to record a successful comparison until it has compared all the y (or 6 in this example) bits of the incoming preamble with the stored preamble, it is apparent that the comparator 48 will not be able to start recording successful comparisons until time $t_3$ (that is, at the start of the last bit of the incoming preamble). At and after $t_3$, the comparator 48 is able to compare six bits of received preamble with the stored preamble and is therefore comparing enough bits to be able to determine whether at least x of them agree with the bits of the stored preamble.

Table A below shows the values of the data samples corresponding respectively to waveforms 4F₁ to 4F₈ which will be passed to the comparator 48 at the time instants $t_3$ to $t_{11}$.

TABLE A

| WAVE-FORM | CORRE-SPONDING TIME | CORRE-SPONDING REGISTER | DATA SAMPLES FED TO COMPARATOR FROM REGISTER |
|---|---|---|---|
| $4F_3$ | $t_3$ | 28 | 0 0 0 0 0 1 |
| $4F_4$ | $t_4$ | 30 | 0 0 1 0 1 1 |
| $4F_5$ | $t_5$ | 32 | 0 0 1 0 1 1 |
| $4F_6$ | $t_6$ | 34 | 0 0 1 0 1 1 |
| $4F_7$ | $t_7$ | 36 | 0 0 1 0 1 1 |
| $4F_8$ | $t_8$ | 38 | 0 0 1 0 1 1 |
| $4F_1$ | $t_9$ | 24 | 0 0 1 0 1 1 |
| $4F_2$ | $t_{10}$ | 26 | 0 0 1 0 1 1 |
| $4F_3$ | $t_{11}$ | 28 | 0 0 0 0 1 0 |

As explained, the comparator 48 compares each of these sequences of data samples with the pre-stored preamble in register 20 which is 0 0 1 0 1 1.

Table B below shows the output produced by the comparator 48 in response to the eight successive comparisons.

TABLE B

| TIME INSTANT | COMPARATOR 48 OUTPUT |
|---|---|
| $t_3$ | 0 |
| $t_4$ | 1 |
| $t_5$ | 1 |
| $t_6$ | 1 |
| $t_7$ | 1 |
| $t_8$ | 1 |
| $t_9$ | 1 |
| $t_{10}$ | 1 |
| $t_{11}$ | 0 |

From Table B, it is apparent that the counter 62 will have attained a count of 7 at time instant $t_{10}$. At time instant $t_{11}$ the comparator 48 will record an unsuccessful comparison, and the count of counter 62 (that is, 7) will be read out and compared in comparator 68 with the threshold value (six in this example). This comparison will be successful, and threshold unit 68 will therefore activate control unit 76, and switch out the multiplier 46. The identity of the time instant corresponding to the first successful comparison stored in the counter 62 will be time instant $t_4$. Therefore, the time instant midway between $t_4$ and $t_{10}$ is $t_7$ (the seventh sampling instant) and the control unit 76 will therefore re-phase the clock pulse 44 so that the next sample taken at the lower rate by the sampling gate 42 will occur at time $T_1$ which is the time when the seventh sampling instant occurs in the next bit period. Therefore, the first bit of the message will be correctly sampled at its mid-point and the clock pulse source 44 of the receiver has been correctly synchronised. Times $t_{13}$ and $t_{14}$ show the next times that the sampling gate 42 (sampling now at the bit rate) samples the incoming data.

FIG. 3 illustrates how comparator 48A controls components corresponding to those controlled by comparator 48 and these components have the same reference numerals but are distinguished by the suffix A. Their operation corresponds to that of the components controlled by comparator 48 and will not be described.

Some of the system illustrated in block diagram form in FIG. 3 can be implemented by a microprocessor operating under software control. For example, the recording of the number of successful comparisons made by the comparators 48 and 48A, and the computation carried out by the comparators 68 and 68A, and the control unit 76, of the correct time instant at which the sampling gate 42 is to commence sampling at the lower rate, may be performed by the microprocessor under software control.

If the threshold number to which the comparators 68 and 68A respond, and which determines the number of successful comparisons which must occur before bit-synchronisation takes place, is made too high (too close to the number of samples, 8 in this case, taken per bit period), then distortion of the incoming waveform may prevent its being recognised by either comparator.

Figure 5:
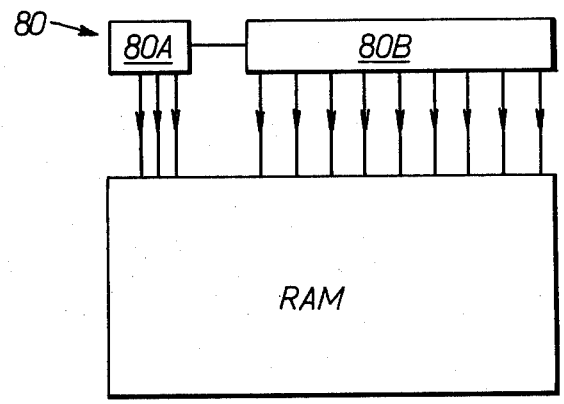
FIG. 5 shows part of the block diagram of FIG. 3 in more detail.

FIG. 5 shows how the registers 24 to 38 of FIG. 3 may be implemented by a 512 bit random access memory for the case where y is 64 and the fast sampling rate is eight times the bit rate.

The RAM is organised into eight 64-bit registers and the RAM has a 512-bit address counter 80 which is divided into a section 80A comprising the three least significant bits of the address of each register stage and a section 80B comprising the six most significant bits of the address of each register stage.

As each data sample is received by the distribution unit 40, the latter feeds the data sample into the appropriate one of the eight 64-bit registers into which the RAM is organised and increments the address counter 80 by 1. Immediately thereafter, and before the next data sample is received, the six most significant counter stages 80B are rapidly counted through a complete cycle by the timing pulses on line 60, that is, stepped on by 64 pulses. During this process, the three least significant counter stages 80A are held static. As the counter stages 80B are incremented in this way, they successively address the 64 stages of the appropriate one of the registers in the RAM and the bit samples are fed out to the comparators 48 and 48A (FIG. 3) on the channel 50.

When the next data sample is received, the distribution unit 40 directs it into the next 64-bit register in the RAM and increments the counter, and the process repeats.

In this way, the three least significant stages of the counter 80 identify the particular one of the eight registers which is active during each sampling time instant while the six most significant stages 80B are used to address each of the stages of that register in turn to output its stored data samples to the comparators 48 and 48A.

In order to generate the preambles $P_a$ and $P_b$ stored in registers 20 and 22 (FIG. 3), the two basic sequences I and II (from which all the preambles are generated as explained earlier) may be stored in each receiver. Each receiver can then be programmed or otherwise instructed to generate the two preambles to be stored in its registers 20 and 22 by instructing it to add the two basic sequences I and II together, after phase-shifting one of them with respect to the other by a predetermined number of bit periods.

From the foregoing, it will be apparent how the preamble of each data message transmitted by the transmitter 5 is used simultaneously to perform the three functions specified above, that is, (a) character framing (identifying the beginning of the data message), (b) addressing either a specific one or all of the receivers and (c) bit-synchronising the addressed receiver or receivers.

What is claimed is:

1. A data transmission system for transmitting data messages, each comprising data units occurring at a predetermined clock rate, from a data transmitter to a specific one of a plurality of receivers to each of which the transmitter is connected by a transmission link and each of which has its own separately controllable clock, comprising preamble generating means in the transmitter for immediately preceding each data message with a predetermined preamble which is intended to be recognizable by one of the receivers to which the message is directed, but not by other receivers to which the message is not directed, each said preamble comprising a predetermined plurality of data units whose combination of values identifies the said one of the receivers, recognition means in each of the receivers and responsive to the values of the data units of each preamble received via the transmission link for testing each such preamble for recognition, character framing means in each of the receivers which is responsive to each recognized preamble to determine that the first part of the message immediately follows, and synchronization means in each receiver which is responsive to each preamble recognized by that receiver for adjusting the timing of the clock of that receiver in dependence on the timing of at least some of the said data units whose combination of values identifies the receiver, whereby to bring that clock into synchronism with the first part of the data message immediately following the preamble.

2. A system according to claim 1, in which the recognition means is arranged to recognise a preamble if it recognises at least a predetermined part thereof, the said part being such, in relation to expected errors in the transmission link, that the probability is high that the recognition means will recognise the correct preamble and being such that the probability is low that the recognition means will recognise noise as the correct preamble.

3. A system according to claim 2, in which the preamble generating means generates each preamble as a plurality of data bits, and each recognition means comprises means in each receiver for comparing each preamble received on the transmission link with a predetermined preamble stored in that receiver, and means for indicating recognition when at least a predetermined plurality of bits forming the said predetermined part of the received preamble agree as to value and position with corresponding bits forming part of the stored preamble.

4. A system according to claim 1, in which the preamble generating means in the transmitter includes means for generating a preamble which is intended to be recognisable by a plurality of the receivers.

5. A system according to claim 1, in which the preamble generating means generates each preamble such that the Hamming distance between any pair of them is large.

6. A data transmission system comprising a data transmitter connected by a transmission link to a plurality of data receivers for sending data messages to any specific one of the receivers, preamble generating means at the transmitter for preceding each data message with a selected one of a plurality of different predetermined preambles each comprising a plurality of serial digits and for transmitting the selected preamble to all the receivers immediately before the data message, one of the preambles being recognisable by all the receivers and each of the remaining preambles being recognisable only by a specific one of the receivers, and recognition means in each received for recognising either the said one preamble or the respective one of the remaining preambles and, in response to such recognition, for receiving the immediately following data message, the preamble generating means comprising means responsive to two basic sequences of serially arranged digits for carrying out a succession of adding operations each comprising the addition of each of the digits of one of the basic sequences to a respective one of the digits of the other basic sequence, whereby each adding operation produces a respective one of the said preambles, the first adding operation comprising the addition of each digit in one basic sequence to the same serially numbered digit in the other basic sequence, the next adding operation involving the addition of each digit in one of the basic sequences to the digit in the other basic sequence having a serial number greater by one (with the last digit of the first sequence being added to the first digit of the second sequence), the third adding operation involving the addition of each digit in the first sequence to the digit of the second sequence having a serial number greater by 2 (with the penultimate and last digits of the first sequence being added to the first and second digits, respectively, of the second sequence), and so on for the remaining adding operations.

7. A system according to claim 6, in which the recognition means in each receiver comprises means operative to compare the digits of an incoming transmitted preamble with the digits of the predetermined preamble of that receiver, and means for indicating recogntion when at least a predetermined block of incoming digits agrees digit by digit with a corresponding block of the digits of the predetermined preamble, the predetermined block being such in relation to digits of the whole predetermined preamble and to the expected occurrence of transmission errors on the transmission link that the probability of any of the recognition means recognising the correct preamble is high and the probability of its recognising noise on the transmission link as the correct preamble is low.

8. A data transmission system, comprising a data transmitter connected to a data receiver by a data transmission link, means in the transmitter for transmitting to the receiver a predetermined waveform having a predetermined frequency, means in the receiver and operative at a predetermined multiple of a reference frequency which is equal to the predetermined frequency but not necessarily in phase therewith to produce successive amplitude samples of each cycle of the predetermined waveform, means responsive to the samples to produce a plurality of pulse trains the first of which comprises pulses respectively dependent on the first amplitude sample in each period of the predetermined waveform, the second of which comprises pulses respectively dependent on the second amplitude sample of each cycle of the predetermined waveforms, and so on for the remaining pulse trains, means operative to compare each pulse train with a waveform corresponding to the predetermined waveform to determine which of the pulse trains have waveforms corresponding with the predetermined waveform and which do not, means operative in response to the pulse trains detected as having waveforms agreeing with the predetermined waveform to assess the serial position within a period of the reference frequency of the samples producing those pulse trains to identify a specific one of those serial positions, and phase-shift means operative to phase-shift the reference frequency of the receiver to bring it into phase with the said specific one of those serial positions, whereby to synchronise the reference frequency of the receiver with the predetermined frequency.

9. A system according to claim 8, including means for counting the number of pulse trains which are detected as having waveforms agreeing with the predetermined waveform and for preventing operation of the phase-shift means until the number counted is at least equal to a predetermined number which is less than the number of the samples within each period of the reference frequency.

10. A system according to claim 8, in which the said specific one of the serial positions is the central serial position.

11. A data transmission system for transmitting regularly timed data signals from a data transmitter to a specific one of a plurality of receivers to each of which the transmitter is connected by a transmission link and each of which has a separately controllable clock, each data signal having a respective value and defining a respective signal period, the system comprising preamble generating means operative in response to a data message intended to be transmitted to a particular one of the said receivers to precede the data signals constituting that data message with a predetermined preamble which is intended to be recognisable by the said one of the receivers but not by others of the receivers to which the message is not directed, the preamble consisting of a predetermined plurality of data signals having predetermined respective values which together identify the said one of the receivers, recognition means in each of the receivers for monitoring the values of the data signals received and operative to recognise only the predetermined plurality of data signals constituting the preamble intended to be recognised by that receiver, character framing means in each of the receivers and operative in response to recognition of the said preamble to determine that the immediately following data signal is the first data signal of the data message intended for that receiver, and signal synchronisation means in each receiver which responds to the timing of at least some of the said signals of each recognised preamble for adjusting the operation of the clock of that receiver so as to synchronise the operation of the receiver with the first signal period immediately following the recognised preamble.

12. A system according to claim 11, in which each recognition means comprises means operative to monitor the values and relative positions of the data signals received via the transmission link and being operative to recognise a preamble if it recognises that at least a predetermined plurality of the signals agree as to value and position with the signals of the complete preamble to be recognised by that recognition means, the said predetermined plurality of sigals being such, in relation to expected errors in the transmission link, that the probability is high that the recognition means will recognise the correct preamble and being such that the probability is low that the recognition means will recognise noise as the correct preamble.

13. A system according to claim 11, in which the preamble generating means in the transmitter includes means for generating a preamble which is intended to be recognisable by a plurality of the receivers.

14. A data transmission system for transmitting serial data bits at a predetermined clock rate from a data transmitter to a specific one of a plurality of receivers each having its own separately adjustable clock and to each of which the transmitter is connected by a transmission link, each data bit defining a respective bit period, the system comprising preamble generating means operative in response to a data message to be transmitted to precede the data bits constituting that data message with a predetermined preamble comprising a predetermined plurality of data bits, character framing means in each of the receivers and operative to recognise the said bits of the preamble to determine that the immediately following data bit is the first data bit of the storage message intended for that receiver, and bit synchronisation means in each receiver which is responsive to the same bits of the preamble as the character framing means and for synchronising the clock of that receiver with the first bit period immediately following the recognised preamble.

* * * * *